United States Patent
Lundin et al.

[11] Patent Number: 6,077,462
[45] Date of Patent: *Jun. 20, 2000

[54] METHOD AND APPARATUS FOR SEAMLESS MICROREPLICATION USING AN EXPANDABLE MOLD

[75] Inventors: David J. Lundin, Woodbury; Kevin M. Eliason, Forest Lake, both of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/026,836

[22] Filed: Feb. 20, 1998

[51] Int. Cl.[7] .................................................. B29D 11/00
[52] U.S. Cl. ........................ 264/1.24; 264/2.5; 264/219; 264/314; 264/335; 264/DIG. 78; 425/440; 425/DIG. 44; 425/DIG. 60
[58] Field of Search ..................... 264/1.1, 1.24, 264/2.7, 313, 314, 219, 2.5, 335, DIG. 78; 425/440, DIG. 44, DIG. 60; 65/17.3

[56] References Cited

U.S. PATENT DOCUMENTS

| | | | |
|---|---|---|---|
| 3,641,332 | 2/1972 | Reick et al. | 264/1.24 |
| 3,776,683 | 12/1973 | Putzer et al. | 425/440 |
| 3,841,822 | 10/1974 | Putzer et al. | 425/440 |
| 3,982,721 | 9/1976 | Maurino et al. | 249/139 |
| 4,045,153 | 8/1977 | Maurino et al. | 425/440 |
| 4,055,620 | 10/1977 | Conrad | 264/313 |
| 4,170,616 | 10/1979 | Jebens . | |
| 4,389,428 | 6/1983 | McDuffee et al. . | |
| 4,620,959 | 11/1986 | Goto et al. | 264/335 |
| 4,871,487 | 10/1989 | Laursen et al. | 264/1.29 |
| 4,909,597 | 3/1990 | Parker et al. . | |
| 4,929,169 | 5/1990 | Fujigaki et al. | 264/1.24 |
| 5,023,042 | 6/1991 | Efferding | 264/511 |
| 5,106,289 | 4/1992 | Pikulski | 425/DIG. 44 |
| 5,244,485 | 9/1993 | Hihara et al. | 65/17.3 |
| 5,432,876 | 7/1995 | Appeldorn et al. | 385/31 |
| 5,631,994 | 5/1997 | Appeldorn et al. | 385/147 |
| 5,792,411 | 8/1998 | Morris et al. | 264/219 |

FOREIGN PATENT DOCUMENTS

| | | |
|---|---|---|
| 0 503 343 A1 | 9/1992 | European Pat. Off. . |
| 737720 | 10/1996 | European Pat. Off. . |
| 832726 | 4/1998 | European Pat. Off. . |
| 62011614 | 1/1987 | Japan . |

OTHER PUBLICATIONS

Cheryl Vrieze and David Lundin, "Matching the Model: Plastic Light Fiber Extraction Targeted at SAE Specifications", Society of Automotive Engineers, Inc., 1998.

*Primary Examiner*—Mathieu D. Vargot
*Attorney, Agent, or Firm*—Robert J. Pechman

[57] ABSTRACT

An apparatus and method for seamless closed mold microreplication using a one-piece expandable mold are disclosed. The apparatus includes an expandable mold having a plurality of microstructured features on the inner surface thereof. The apparatus also includes a means for elastically expanding the mold in order to remove the finished molded article. The expandable mold may be used to make seamless articles having microstructured features, such as an illumination device comprising a fiber core having a plurality of microstructured light extraction structures on the surface thereof.

7 Claims, 4 Drawing Sheets

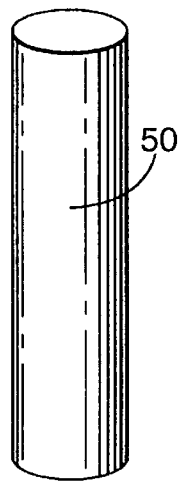
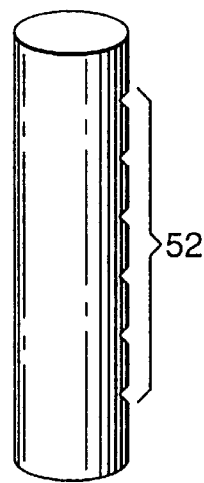
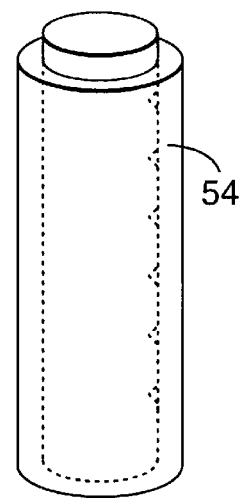
Fig. 3a  Fig. 3b  Fig. 3c
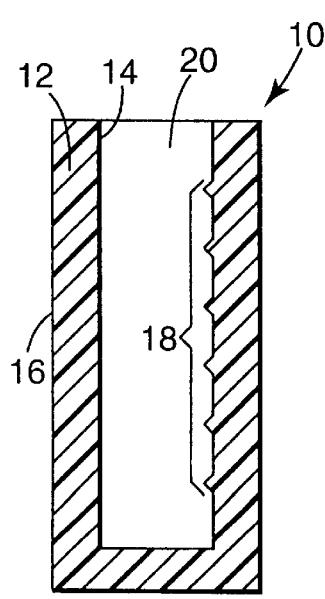
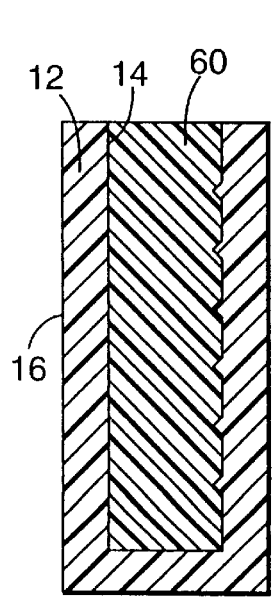
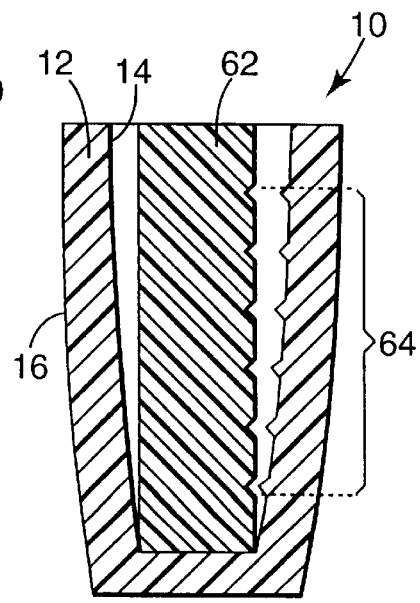
Fig. 4a  Fig. 4b  Fig. 4c

METHOD AND APPARATUS FOR SEAMLESS MICROREPLICATION USING AN EXPANDABLE MOLD

FIELD OF THE INVENTION

The present invention relates generally to a method and apparatus for molding using an expandable mold.

BACKGROUND OF THE INVENTION

Conventional methods of molding typically utilize two-piece molds. When the separate halves of a two-piece mold are mated and sealed, a liquid material can be injected into the hollow space between the halves. The contours inside this hollow space define the shape of the final molded article. The liquid is cured, and when it is sufficiently hardened, the halves may be de-coupled to facilitate removal of the finished article from the mold. The halves of the mold are typically made of rigid materials to withstand the pressure and heat present in the injection and hardening process and to resist deformation during the molding process. Resistance to deformation is particularly important when the tolerances for the molded article are small.

Molding using such conventional techniques often results in a build-up of excess material on the molded article coincident with the seam between the two halves of the mold. This is especially true when highly detailed articles are to be molded since in such cases the entire molding process is geared towards accurate reproduction of very small features. Unintended but unavoidable small gaps that exist at the seam between the two halves of the mold are thus reproduced along with the desired features of the mold.

A method of seamless article molding is disclosed in U.S. Pat. No. 3,841,822 to Putzer et al. There, a generally hollow, one-piece, distensible mold was provided. The inner surface of the mold is formed to give the molded article its final shape. The walls of the mold are designed to be thick enough to support the weight of the material poured into the mold without distortion, and yet thin enough to remain flexible. When the molded article is finished, the mold can be radially expanded by applying a pressure differential between the inside and outside of the mold. This is done either by placing the mold in a vacuum pot to create a low pressure outside the mold or by injecting fluid into the mold to create a high pressure inside the mold. Using either method, the mold is expanded sufficiently to remove the finished article.

The Putzer mold, while allowing seamless molding of fairly complex shapes, addresses only the problems with reproducing macroscopic details from molds to molded articles. However, there are applications where it would be beneficial to replicate molded parts having detailed features that must be reproduced down to a microscopic scale without concurrently imparting seam lines on the article. For example, it may be desirable to fabricate an illumination device that is engineered to provide a precise pattern of light at precise intensities at a location that is remote from a light source.

Fabricating such an illumination device may begin by forming a transparent elongated fiber core. The fiber core is designed such that light that is injected into the fiber at one end travels to the other end without loss of light due to transmission at the surface of the fiber. This well-known phenomenon is called total internal reflection. As taught in U.S. Pat. No. 5,432,876 (Appledorn et al.), features may be imparted onto the surface of the fiber that allow a controlled "extraction" of light through the walls of the fiber. Appropriate design of such features will produce a precise pattern of extracted light.

Various methods of producing such extraction structures are known. One method involves micro-machining such structures into a tape with an adhesive backing that can be adhered to the fiber core. However, in this manner, two extra interfaces are added, namely the fiber/adhesive interface and the adhesive/tape interface. Each such interface will reduce the precision of light extraction. Another method is to micro-machine the features directly into the fiber itself. Among the problems with this solution is that materials having desirable fiber properties (e.g. transparency, flexibility, high refractive index) often are not amenable to precise micro-machining. Thus, it may be very difficult, costly, and time-consuming to directly micro-machine features with a microscopic degree of precision and accuracy into fiber core materials.

SUMMARY OF THE INVENTION

The present invention provides a method and apparatus for microreplication using a one-piece expandable mold to thereby produce molded articles having microstructured surfaces and having no molding seams.

In one aspect, the present invention provides an apparatus for seamless microreplication using an expandable mold. The apparatus includes an expandable one-piece mold having a generally hollow portion of flexible material. The hollow flexible portion of the mold includes an inner surface and an outer surface. The inner surface is characterized by a plurality of microstructured features and is accessible through an opening in the outer surface of the hollow flexible mold. The apparatus also includes a means for expanding the flexible mold.

In another aspect, the present invention provides a process for making a one-piece expandable mold for seamless microreplication. The process begins with providing a stock material which is machined to form a mold master. During machining of the mold master, a plurality of microstructured features are imparted into the surface of the mold master. The mold master is then covered with a curable material that, when cured, forms an expandable mold. Also, during the curing process when the material is hardened, the material is imparted with a replica of the plurality of microstructured features from the mold master so that the inner surface of the mold contains the microstructured features. Finally, the expandable mold is separated from the mold master by expanding the mold relative to the mold master and removing the master from the mold.

In still another aspect, the present invention provides a method for seamless microreplication using a one-piece expandable mold. First, an expandable one-piece mold is provided. The one-piece mold has an inner surface characterized by a plurality of microstructured features. The one-piece mold is then filled with a curable material which is hardened to form a molded article. The step of curing the curable material substantially replicates the microstructured features of the inner surface of the mold into the surface of the molded article. Once formed and hardened, the molded article may be removed from the mold by elastically expanding the mold. The step of elastically expanding the mold preferably takes place by injecting a fluid under pressure between the mold and the molded article.

In a particular embodiment, the method for seamless microreplication using the one-piece expandable mold of the present invention may be employed to make an illumination device. In so doing, a curable material is chosen such that, when hardened, it forms a substantially optically transparent article. In addition, the microstructured features of the inner surface of the mold are designed such that, when replicated into the surface of the molded article, the microstructured features form a plurality of light extraction structures on the transparent molded article. The mold is then elastically expanded to remove the illumination device.

BRIEF DESCRIPTION OF THE DRAWINGS

FIGS. 3(a) through 3(c) schematically depict the steps of making the mold of the present invention.

FIGS. 4(a) through 4(c) schematically depict the steps in the method of seamless microreplication of the present invention.

DETAILED DESCRIPTION

A. Definitions

Figure 1A:
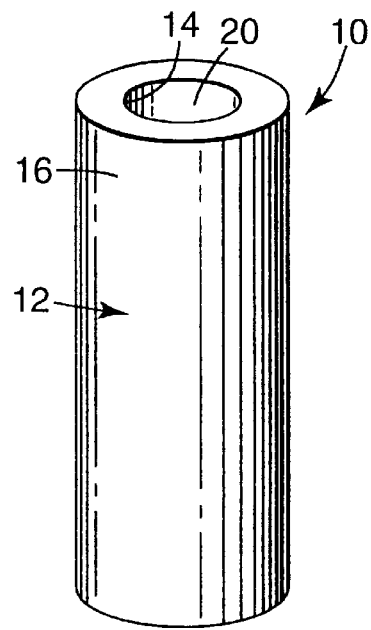
FIG. 1(a) is a schematic representation of the mold of the present invention.

The following terms are used herein according to the definitions provided.

The term "microreplication" refers to a process whereby microstructured features are imparted from a master or a mold onto an article. The master is provided with a microstructure by micro-machining techniques such as diamond turning or laser ablation. The surface or surfaces of the master having the microstructure may be covered with a hardenable material so that when the material is hardened, an article is formed that has a negative replica of the desired microstructured features.

The term "microstructured" refers to features having characteristic dimensions measured in micrometers ($\mu$m) or sub-micrometers. In general, microstructured features may have characteristic dimensions ranging from less than 0.01 $\mu$m to more than 100 $\mu$m. What constitutes a characteristic dimension of a feature depends on the type of feature. Examples include the width of trough-like features in a surface, the height of post-like protrusions on a surface, and the radius of curvature at the point of sharp protrusions or indentions on a surface. Thus, even a macroscopic feature can be said to be microstructured if a characteristic dimension of the feature, such as an angle between two surfaces of the feature, has dimensions with sub-micrometer tolerances.

The term "one-piece mold" refers to a generally hollow mold having an inner surface and an outer surface where the inner surface is accessible through at least one opening. Material is hardened inside the mold so that the inner surface of the mold determines the shape of the finished article.

The term "expandable mold" refers to a mold whose walls are flexible in at least one direction so that by applying a pressure differential between the inside and the outside of the mold, the walls of the mold will distend to facilitate removal of the molded article.

The term "elastic expansion" refers to expansion or stretching of a flexible material such that when the expansion force is released, the material relaxes back into its original position and is not permanently distorted. Thus, the material may be repeatedly elastically expanded over many cycles.

The term "light guide" refers to an article that receives light at an input end and propagates the light to an output end or to a light extractor without significant losses. In general, light guides operate on the principle of total internal reflection whereby light traveling through the light guide is reflected at the surfaces of the light guide with minimal losses. To achieve this state, it is necessary that the index of refraction of the light guide is higher than the index of refraction of the medium immediately surrounding the light guide.

The term "illumination device" refers to a light guide having one or more output portions arranged in such a fashion as to provide a desired pattern of illumination at a desired intensity.

The term "light extraction structure" refers to an element on the surface of a light guide placed there by design to direct light out of the light guide. As such, these structures serve as areas where light rays are directed, or "extracted," out of the light guide.

The term "front extracting" refers to light extraction structures that cause light to be transmitted out of the light guide at the surface containing the extraction structures.

The term "back extracting" refers to light extraction structures that cause light to be transmitted out of the light guide at a surface opposing the extraction structures.

The term "optically transparent" refers to a material that is a substantial transmitter of light having wavelengths in at least a portion of the visible optical spectrum.

The terms "cured," "hardened," and "polymerized" are used interchangeably herein to describe a curing process by which a liquid composition, comprising, for example, a monomer, polymer precursors, or mixtures thereof, is solidified. The terms "curable," "hardenable," and "polymerizable" are used interchangeably to describe materials that, when in liquid form, may be solidified by a curing process.

B. Molding Apparatus

The present invention includes an apparatus for seamless microreplication using a one-piece expandable mold, a method of making an apparatus for seamless closed mold microreplication, and a method of seamless microreplication using an expandable one-piece mold.

Figure 1B:
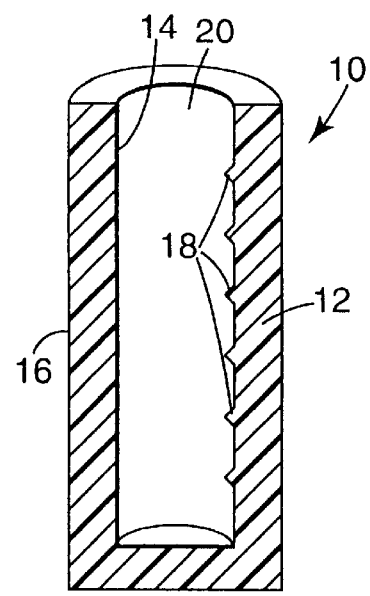
FIG. 1(b) is a schematic cross-sectional view of the mold of the present invention.

The apparatus for microreplication of the present invention comprises an expandable one-piece mold 10 as shown in FIG. 1(a) and in cross-section in FIG. 1(b). The mold comprises a generally hollow portion 12 characterized by an inner surface 14 and an outer surface 16. Furthermore, inner surface 14 is imparted with a plurality of microstructured features 18. The inner portion of mold 10 is accessible through at least one opening 20.

Mold 10 is formed so that at least hollow portion 12 comprises an elastically expandable material. The material making up the hollow portion should allow expansion of hollow portion 12 in all directions perpendicular to opening 20. Expansion in all directions perpendicular to the opening constitutes radial expansion of the mold. The expandable material should also be chosen to minimize adherence with the molded article so as to promote facile release of the molded article from the mold. As a class of materials, elastomers are useful for their elastic expansion capabilities. For example, a preferred elastomer is a silicone elastomer due to its enhanced release properties. Particular silicone elastomers that may be employed are those sold by Dow Corning Corporation, Midland, Mich., under the trade designation Sylgard™, as, for example, Sylgard #184. The specific formulation of the expandable material of the mold will depend on the desired elasticity properties and release properties. Other materials such as polyvinylchloride (PVC)

or silicone-elastomer-based mixtures may be useful depending on the exact application.

The thickness of the walls of hollow portion 12, given by the perpendicular distance between inner surface 14 and outer surface 16, should be thin enough to allow the mold to be elastically expanded to facilitate removal of a finished molded article from the inside of the mold, and yet thick enough to resist deformation against the weight of a material placed inside the mold to be hardened into a finished article. For a mold comprising a silicone elastomer, the wall thickness is preferably in the range of about 0.2 cm to about 5 cm, and more preferably in the range of about 0.5 cm to about 1 cm. Additionally, the macroscopic profile of outer surface 16 preferably closely matches the macroscopic profile of inner surface 14 so that, when elastically expanded to release a molded article, the mold expands relatively uniformly around its center.

A plurality of microstructured features 18 are imparted on inside surface 14 of hollow portion 12. Microstructured features 18 may substantially cover the entire inner surface 14, or they may be limited to one or more particular areas of inner surface 14. Generally, microstructured features 18 may be protrusions from inner surface 14 or indentions into inner surface 14, or combinations thereof. For example, microstructured features 18 shown in FIG. 1(b) comprise a series of parallel ridges protruding from inner surface 14 and spaced at uniform distances.

Opening 20 in the generally hollow portion 12 of mold 10 should be large enough to allow facile introduction of material into mold 10 for hardening and large enough to allow facile removal of a finished article from mold 10 upon expansion of hollow portion 12. Preferably, the cross-sectional shape of opening 20 conforms to the general or average cross-sectional shape of the final molded article.

While the general shape of mold 10 shown in FIG. 1 is elongated and cylindrical, it should be emphasized that mold 10 may be any shape desired. The cylindrical shape of mold 10 in FIG. 1 and the examples given below are merely illustrative and are not meant to limit the scope of the present invention and the claims recited hereinafter.

The apparatus for seamless microreplication of the present invention also comprises a means for expanding the expandable hollow portion of the mold. In general terms, the means for expanding the mold should operate by creating a pressure differential between the inner and outer surfaces of the hollow portion of the mold. To expand the mold outwardly to release the molded article, the pressure inside the mold must be greater than the pressure outside the mold. This may be accomplished either by creating a low pressure outside the mold or by creating a high pressure inside the mold.

Figure 2A:
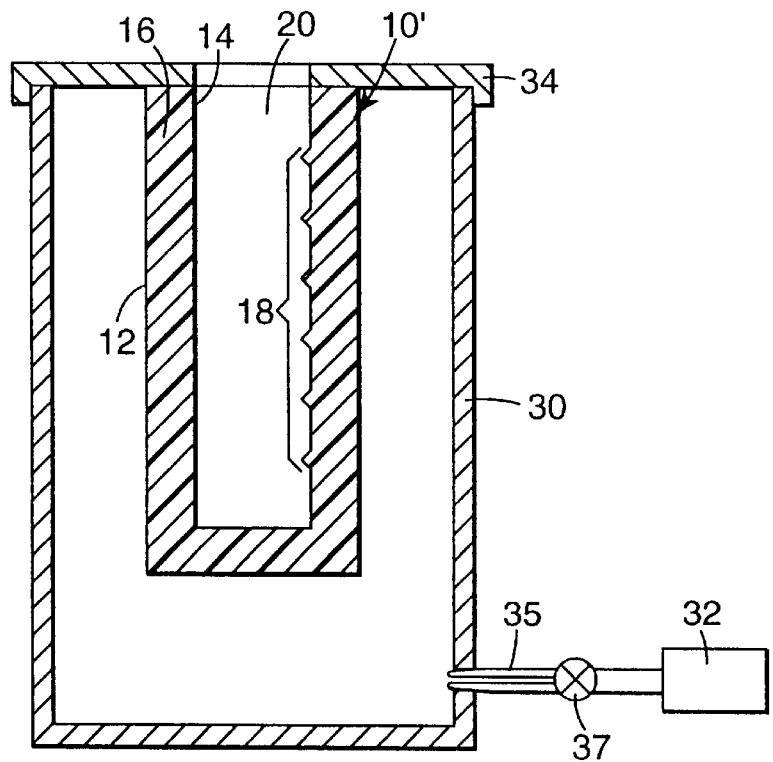
FIGS. 2(a) and 2(c) are schematic and cross-sectional views of means of expanding the mold of the present invention by applying a differential pressure.

FIG. 2(a) shows a means for expanding the mold by creating a low pressure outside the mold. There, an expandable mold 10' having a hollow portion 12 is provided. The mold is inserted into vacuum pot 30. To secure mold 10' in vacuum pot 30 and to form a seal between vacuum pot 30 and mold 10', mold 10' is provided with a rigid portion 34 extended outwardly from opening 20. A large enough gap should exist between the walls of vacuum pot 30 and mold 10' to allow mold 10' enough room to radially expand to permit release of a molded article. A conventional vacuum pump 32 is connected to vacuum pot 30 by a tube 35 and a valve 37. When vacuum pump 30 operates, a differential pressure is created between outer surface 16 and inner surface 14 of mold 10'. The low pressure in vacuum pot 30 causes mold 10' to distend outwardly. The pressure differential required to elastically expand the mold in this fashion will depend on the shape of mold 10', the thickness of the walls of mold 10', and the material out of which mold 10' is made.

Figure 2B:
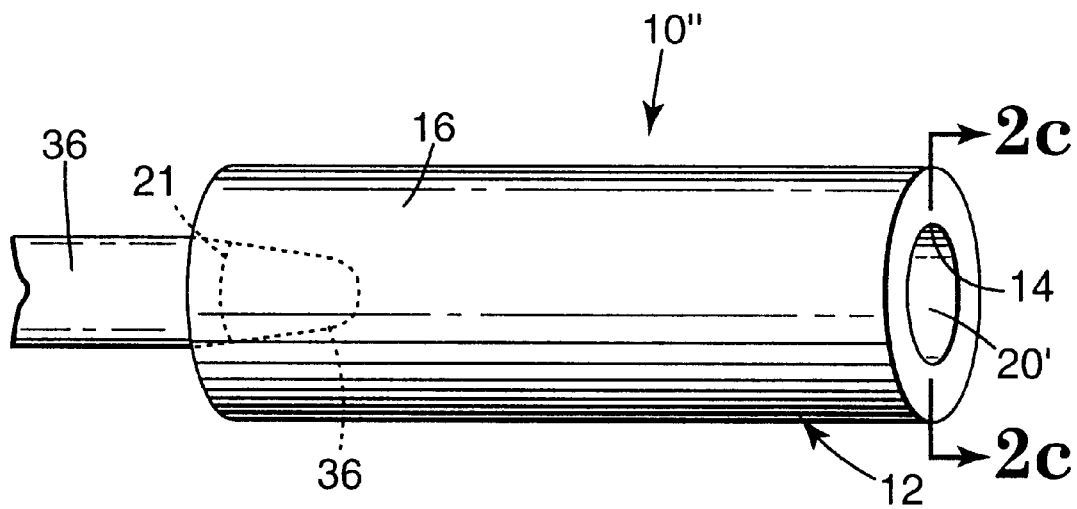
Figure 2C:
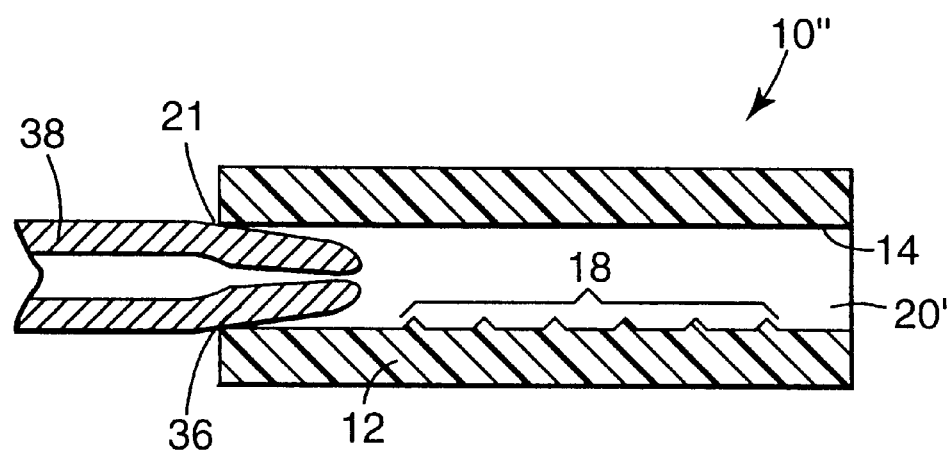

A means for expanding a mold 10" by creating a high internal pressure is shown in FIG. 2(b) and in cross-section in FIG. 2(c). In such a configuration, mold 10" is preferably shaped like a sleeve having a first opening 20' for removal of the molded article and a second opening 21 at an opposing end of mold 10" to allow insertion of a nozzle 36. Nozzle 36 in turn may be part of a tube 38 that carries compressed air or liquid from a source (not shown). To remove a molded article, nozzle 36 is inserted into opening 21 such that a sufficient seal is formed between nozzle 36 and mold 10". Injection of compressed air, for example, at a pressure appropriate for the thickness and elasticity of the mold being used radially expands mold 10" and forces the molded article towards opening 20'.

Other ways of injecting a high pressure fluid into mold 10 may also be employed. For example, a mold 10 having a single opening 20 as shown in FIG. 1 may be affixed with a tube capable of carrying high pressure fluid into mold 10 between a molded article and inner surface 14. The tube may be positioned at any point on mold 10, but preferably is positioned far enough away from the microstructured features of the mold so as not to interfere with their replication.

C. Method for Making the Molding Apparatus

The method for making the mold of the present invention is shown in FIGS. 3(a) through 3(c). The first step is to provide a machineable stock material 50. The stock material should have substantially the same macroscopic shape as the final articles to be molded. The stock material is then micro-machined to provide a plurality of microstructures 52 on its surface. At this point, the stock material is called a mold master. The mold master represents the shape of the articles to be molded. The mold master is then covered with a curable material. When the curable material is hardened, it forms a mold such as that shown in FIGS. 1(a) and (b). The mold is then removed from the mold master by expanding the mold.

The stock material may be of any machineable material capable of being separated from the mold material after the mold material has been cured. For example, the stock material may comprise a machineable metal or a hard polymer. Suitable metals include copper, nickel, aluminum, silver, gold, and platinum, and alloys such as brass. Suitable polymers include acrylics, carbonates, and any other polymer that may be machined and retain its shape.

Micro-machining stock material to form the mold master may be performed by any known technique such as diamond turning or laser ablation. Typically, micro-machining is performed using a diamond- or carbide-tipped tool. The profile of the tip will be determined by the shape and dimensions of the structures desired in the mold master. For example, if simple grooves having inverted triangular profiles, as shown in the Figures, are desired, the tip may be a triangular tip whose apex has the same angle as the grooves. Some structures may require multiple passes to form the profile of a single feature. Known micro-machining techniques will reproduce surface structures accurately with precisions approaching 0.001 $\mu$m.

The material used for the mold is preferably flexible when cured so that the mold is elastically expandable. Suitable curable materials include elastomers. Preferably the curable material is a silicone elastomer, for its elastic and release properties.

When covering the mold master with a curable material to form the mold, it may be advantageous to place the mold master inside a mandrel. If this is done, the mandrel should have an interior that has dimensions somewhat larger than the dimensions of the exterior of the mold master. The gap that exists between the inside of the mandrel and the surface of the mold master will then define the wall thickness of the mold. The curable material can then be injected into the mandrel around the mold master. The curable material is then hardened around the mold master. When the material is cured, the mandrel may be removed.

Once the mold material is cured around the mold master, the mold master must be separated and removed from the cured mold. The same techniques described for removing a molded article from a mold may be used to remove the mold master. Alternatively, if the mold master has a significantly different coefficient of thermal expansion than the mold, the mold master and mold may be separated by heating or cooling them sufficiently. Typically, this will only be possible if the mold master is metallic.

D. Method of Seamless Closed Mold Microreplication

The method of closed mold microreplication using an expandable one-piece mold of the present invention is shown in FIGS. 4(a) through 4(c). FIG. 4(a) shows a one-piece expandable mold 10. Mold 10 has a generally hollow portion 12 that has an outer surface 16 and an inner surface 14. The inner surface of the mold has a plurality of microstructured features 18. The inside of the mold is accessible through an opening 20. The mold provided as shown in FIG. 4(a) is in all ways analogous to the mold shown in FIGS. 1(a) and 1(b) and described above.

The next step is to fill the inside of the mold with a curable material 60 as in FIG. 4(b). Preferably, curable material 60 is in liquid form when introduced into mold 10 so that material 60 flows around microstructured features 18 inside mold 10. Curable material 60 may be any material that can be introduced into the mold and hardened at temperature and/or pressure conditions that do not adversely affect mold 10. Preferably, the curable material comprises a polymerizable compound or mixture. Curable material 60 may be curable by heat, radiation, or other known processes.

The method of introduction of the curable material into the mold may be affected by the shape of the mold itself. For example, if the mold has a relatively high aspect ratio (height of the mold to the cross-sectional width of the hollow portion of the mold), care may be required to prevent the formation of bubbles in the curable material while it is being poured. If bubbles form, they may nucleate or become trapped near the microstructured features of the mold. This will adversely affect the ability to replicate the microstructures. Bubble formation may generally be avoided simply by reducing the rate at which liquid material is introduced into the mold. Curable material 60 is then hardened inside the mold to form finished article 62.

Curable material 60 is preferably chosen to be a type of material that does not significantly shrink upon hardening. If the curable material tends to contract upon hardening, the material may potentially pull away from microstructured features 18 while hardening. This "pulling away" may result in poor replication of the microstructures from the mold into the finished article. If a curable material that tends to contract significantly upon hardening is chosen, however, accurate and precise microreplication may still be obtained. If curable material 60 is of a type that contracts upon curing, the operator may inject curable material 60 into mold 10 under pressure. The amount of material and pressure used will preferably cause expansion of the mold by the same amount that curable material 60 is expected to contract upon hardening. In this manner, when the curable material is hardened, the mold relaxes into its original position as the curable material contracts to counteract the effects of pulling away during hardening.

After curable material 60 is hardened inside mold 10 to form finished article 62 including a negative replica of microstructured features 18, finished article 62 may be removed from mold 10. As shown in FIG. 4(c), mold 10 is elastically expanded to separate inner surface 14 from finished article 62. Mold 10 may be expanded by any method of elastic expansion as discussed previously. The plurality of microstructured features 64 on the finished article substantially replicate the plurality of microstructured features 18 of the inner surface of mold 10.

E. Method of Making an Illumination Device

The method of seamless closed mold microreplication of the present invention is particularly useful for imparting microstructures on articles without directly machining the microstructures into the articles. The method of the present invention also provides the beneficial ability to mold articles having microstructures without creating seams which may adversely affect the functionality of the article.

As an illustrative example, the method of seamless microreplication of the present invention may be used to make an illumination device comprising a fiber core having a plurality of light extraction structures extending into the core.

A typical illumination device includes a light guide. A light guide may be likened to a length of conventional optical fiber. Such a fiber generally has a core fiber with a particular cross-sectional geometry (i.e., circular, elliptical, etc.) and a cladding around the core. The refractive index of the core is greater than the refractive index of the cladding. The cladding may include a protective layer of material, or, in its simplest form, may even be ambient air. In use, a beam of electromagnetic energy, such as visible light, introduced into the core at one end of the fiber will always strike the core/cladding interface at an angle greater than the critical angle and so will be totally internally reflected. As a result, the light will be transmitted to the other end of the fiber without significant losses.

An illumination device also includes structures on or in the core that cause the light traveling through the core to be transmitted outside of the fiber in controlled areas and at controlled intensities. Such structures are called extraction structures. U.S. Pat. No. 5,432,876 to Appeldorn et al. discloses illumination devices having extraction structures directly on or in the fiber core; and U.S. Pat. No. 5,631,994 to Appleldorn et al. discloses extraction structures formed on external overlays that may be attached to light guides to form illumination devices.

Figure 5A:
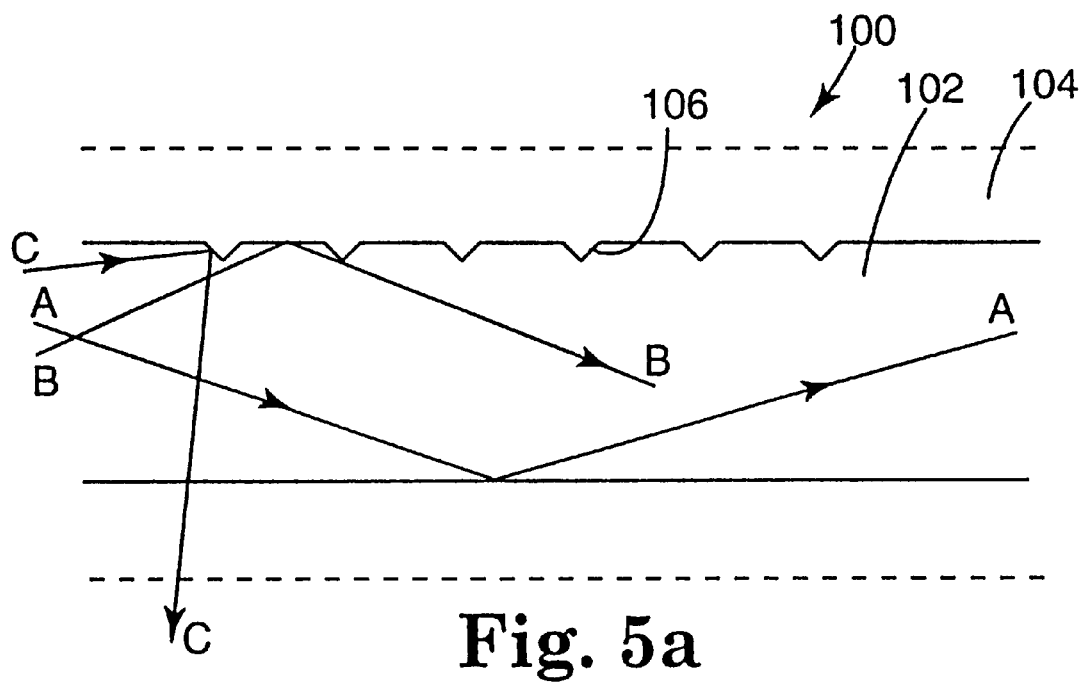
FIGS. 5(a) and 5(b) are schematic side views of the operation of illumination devices fabricated using the method of seamless microreplication of the present invention.

Generally, there are two types of extraction structures, namely front extracting and back extracting. FIG. 5(a) shows a side view of an illumination device 100 having a core 102 and an optional cladding 104 (represented by the dashed lines in FIG. 5(a)). Core 102 has been imparted with a plurality of back extraction structures 106 comprising a series of precise grooves in the surface of the core. The illumination device functions as shown by the light rays A, B, and C. As light travels through the core from left to right in FIG. 5(a), ray A is reflected at the core/cladding interface and continues to propagate down the fiber core. Ray B is incident at the core/cladding interface between extraction structures and is likewise reflected by total internal reflection. Ray C, however, is incident at the core/cladding interface on the surface of a back extracting structure. The surface of the extraction structure is angled relative to the surface of the core so that when light rays such as ray C are incident at the surface of the structure, the rays are reflected through the cross-section of the core and transmitted through the surface of the fiber opposite the structure. Thus, extraction structures 106 are termed back extraction structures because they direct light out of the core on the side opposite the structures themselves.

Figure 5B:
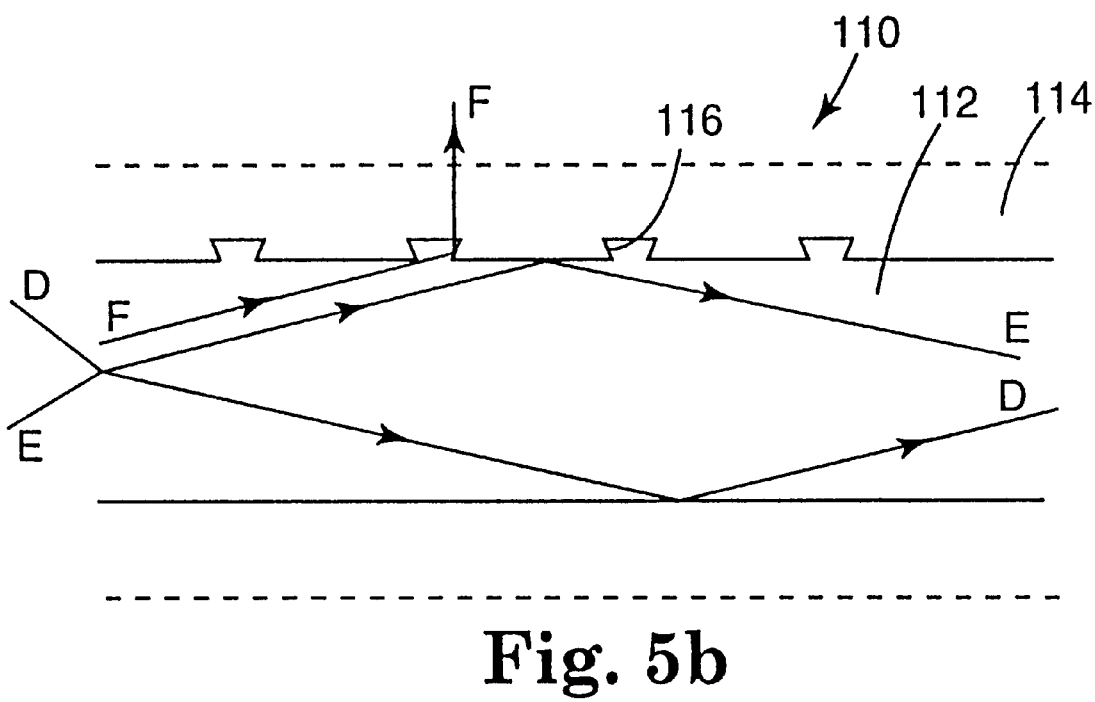

FIG. 5(b) shows an illumination device 110 having a core 112, optional cladding 114, and front extraction structures 116 on the core. Illumination device 110 functions in much the same manner as illumination device 100 shown in FIG. 5(a). Rays D and E are reflected internally and continue to propagate down the core of the fiber. Ray F, however, is incident on the surface of light extraction structure 116 and is reflected at such an angle that it is transmitted through an adjacent surface of the extraction structure and out of the fiber. Because extraction structures 116 direct light out of the core on the side including the structures, they are termed front extraction structures. Both front extraction structures and back extraction structures may be formed as indentions (as in FIG. 5(a)) or as protrusions (as in FIG. 5(b)).

The method of seamless closed mold microreplication of the present invention may be used to make an illumination device having a plurality of light extraction structures. When making an illumination device such as described above, the material of the mold is preferably a silicone elastomer such as Sylgard 184 sold by Dow Corning Corporation, Midland, Mich. The microstructured features of the inner surface of the mold may generally be indentions, protrusions, or a combination thereof. The type of extraction structures and the dimensions and geometry of the extraction structures are chosen based on the desired illumination properties of the final device. Various extraction structure dimensions and arrangements are disclosed in detail in U.S. Pat. No. 5,432,876 to Appeldorn et al.

When molding an illumination device, the curable material used to make the finished light guide preferably hardens into a substantially optically transparent material. As a general class of curable materials, acrylates are preferred for their transparency properties. However, for many applications, a more flexible finished article is desired. In such cases, urethanes may preferably be employed. Urethanes are also desirable because their contraction during hardening tends to be minimal, although the transparency properties of certain formulations may be less that desired.

When making an illumination device according to the present invention, preferable curable polymeric materials include polyurethanes comprising the polymerization reaction product of one or more polyisocyanates with one or more polyols. Preferably, polyurethanes useful in the present invention are thermoplastics and thermosets, and are substantially optically transparent and/or capable of transmitting visible light.

Preferred polyurethanes comprise flexible or rigid, thermoplastic or thermoset aliphatic polyurethanes. Useful aliphatic polyurethanes can be formed from reactions of polyester polyols with polyisocyanates and, optionally, chain extenders. The mole ratio of polyol:polyisocyanate:chain extender can be from about 1:1:0 to about 1:15:14. The preferred polyurethanes useful in the invention exhibit excellent stability under prolonged exposure to light, particularly ultraviolet light. Preferably, aliphatic polyurethanes useful in the invention comprise:

a) soft segments comprising isocyanate-terminated polyester polyol molecules having molecular weights of about 200 to 15,000;

b) optionally, hard segments comprising predominantly the reaction product of a chain extender with the isocyanate end-groups of the soft segments and additional polyisocyanate; and c) sufficient aliphatic polyisocyanate to react with essentially all of the polyester polyol and chain extender molecules present.

The incorporation of hard segments in the formulation is optional. Hard segments may improve the strength and may increasing the refractive index of the polyurethane waveguide, as needed, provided that they do not adversely affect the light transmissive properties of the waveguide of the invention.

In addition to the urethane linkage, optionally there may be various amounts of other linkages such as isocyanurates, biurets, allophonates, amides, or oxazolidones present in the waveguide. In these instances, additional polyisocyanate beyond the amount previously described would be required, but the additional linkages cannot be present to such an extent that they would cause phase separation resulting in light scattering, thereby reducing the effectiveness of the waveguide. In addition, plasticizers such as dibutyl adipate, catalysts such as dibutyltin dilaurate, and other additives such as stabilizers and antioxidants may be added in amounts necessary to assure satisfactory product performance.

Aliphatic polyurethanes useful in the invention may be blended with other optically clear polymers, provided that the blend is compatible, or that the domains formed are small and do not scatter light which would reduce the effectiveness of the resulting waveguide.

Preferred glycols include glycols predominantly derivable from branched $C_3$–$C_6$ alkylene oxides, although some units derived from ethylene oxide may be included, providing the essential effect of branched units on the character of the pre- and final polymers is retained and phase crystallization does not occur. The amount of ethylene oxide units is preferably less than about 20 weight percent of the total amount of alkylene oxide units. More preferred are glycols predominantly derivable from propylene oxide and/or butylene oxide, including, for example, poly(oxypropyleneoxyethylene)glycol, (commercially available under the trade designation VORANOL™ 5287 and sold by Dow Chemical Company, Midland, Mich.) with a molecular weight of about 2000, and poly(oxybutyleneoxyethylene) glycol.

Additional preferred higher molecular weight polyols include the polyethylene and polypropylene oxide polymers in the molecular weight range of from about 200 to about 20,000 such as the series of poly(ethylene oxide) compounds available from Union Carbide Corp., Danbury, Conn. and sold under the trade designations Carbowax™ 400, 600, 800, 1000, 3350, 8000 and 20000; the polyether polyols available from Hercules Chemical Specialties Co., Wilmington, Del. under the trade designation Structon™ HPOR 0100 NCB; and poly(tetramethylene ether)glycols in the molecular weight range of from about 200 to about 4000, such as the series of polyols available from DuPont Co., Wilmington, Del. and sold under the trade designations Terethane™ 1000 and 2000.

Particularly preferred polyols useful in preparing optical elements of the invention include polyester polyols. Examples of useful polyester polyols include polycaprolactone polyols in the molecular weight range of from about 200 to about 5000, such as the series of polyols sold under the trade designations Tone™ 200, 210, 230, 240, 260, 301, 305, and 310 as available from Union Carbide; hydroxy-terminated polybutadiene materials, such as the series of polyols sold under the Poly bd™ trade designation as available from Elf Atochem, Philadelphia, Pa.; hydrogenated polybutadiene polyols, such as those sold under the trade designations Polytail H and Polytail HA by Mitsubishi Gas Chemical America Inc., New York, N.Y.; aliphatic block co-polymer polyols, such as poly(ethylene-butylene)diols as sold by Shell Chemical Co., Houston, Tex. under the trade designation Kraton™ HPVM 2201; polyglycol esters of dibasic acids such as adipic acid, azeleic acid, sebacic acid and the like, such as the family sold under the Desmophen™ trade designation by Bayer, Pittsburgh, Pa., as Desmophen 670-80, 670-100, 800, and 1100, and the family sold under the trade designation CAPA™, available from Solvay Interox, Houston, Tex., as CAPA™ 200 and 301; polyethylene terephthalate polyols, such as that sold by Cook Chemical Co., San Clemente, Calif. under the trade designation Chardanol™; acrylic polyols, such as the series sold by S. C. Johnson & Sons, Inc., Racine, Wis. under the Joncryl™ trade designation; carboxy-functional polyester polyols, such as that sold by Inolex Chemical Co., Philadelphia, Pa. under the trade designation Lexorex™ 1405; polycarbonate polyols, such as sold under the trade designation Permanol™ by Permuthane Coatings Div., Stahl U.S.A., Peabody, Mass.; and random copolymers of poly (tetramethylene oxide)/polycarbonate, such as the series of polyols available from BASF Corporation, Mount Olive, N.J. and sold under the trade designation PolyTHF CD™.

Preferred diisocyanates are free of aromatic moieties and comprise only aliphatic and/or cycloaliphatic moieties. Preferred diisocyanates include polymethylene diisocyanates such as 1,6-hexamethylene diisocyanate and 1,12-dodecane diisocyanate, methylene bis(4-isocyanatocyclohexane), 1,3- and 1,4-bis(isocyanatomethyl)cyclohexane, cyclohexane-1,4-diisocyanate, cyclohexane-1,3-diisocyanate, 2,2,4-trimethylhexamethylene diisocyanate, cyclobutane-1,3-diisocyanate, isophorone diisocyanate(1-isocyanato-3,3,5-trimethyl-5-isocyanato)cyclohexane, IPDI), 2,4- and 2,6-hexahydrotolylene diisocyanate, perhydo-2,4'- and -4,4'-diphenylmethane diisocyanate ($H_{12}$MDI, available under the trade designation Desmodur™ W from Bayer Corp., Pittsburgh, Pa.), polyisocyanates containing isocyanurate groups, such as the isocyanurate of 1,6-hexamethylene diisocyanate (trade designation Desmodur™ N-3300 from Bayer Corp.), hexahydro-1,3- and -1,4-phenylene diisocyanate, mixtures of 2,2,4- and 2,4,4-trimethyl hexamethylene diisocyanate (TMDI), di(isocyanatoethyl) carbonate, lysine diisocyanate, 1,6-diisocyanato-2,2,4,4-tetramethyl hexane, 1,8-diisocyanato-p-menthane, and isopropylidine bis(4-isocyanatocyclohexane), including mixtures of isomers of the above diisocyanates, oligomers of the above diisocyanates, and any combinations of the above diisocyanates and oligomers thereof.

Preferred chain extenders include aliphatic $C_2$–$C_4$ straight chain and branched chain diols, diamines, and hydroxy amines; hydrazine and piperazine, cyclo- and cycloaliphatic diols, diamines or hydroxy amines having up to 12 carbon atoms, hydroquinone and resorcinol (as such or as the bis(2-hydroxyethyl)ethers), and aromatic and heteroaromatic nuclei (and their fully-hydrogenated counterparts) substituted with two groups that are methylol and/or aminomethyl. More preferred chain extenders include aliphatic $C_2$–$C_4$ straight and branched chain diols and cycloalkyl diols, such as ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-cyclohexane dimethanol, 1,4-cyclohexanediol, trimethylolpropane, 1,4-bis(hydroxymethyl cyclohexane), 2-methyl-1,3-propanediol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxy diphenyl propane and dihydroxy methyl hydroquinone. Other suitable types of chain extenders include fluorine-substituted difunctional diols such as 1,2,3,4,4-hexafluoropentane-1,5-diol and phenyl-substituted $C_2$–$C_5$ diols such as 2-phenyl-1,3-propylene glycol and phenyl-1,4-butylene glycol. Of course, mixtures and combinations of the above diols can be used as chain extenders.

The mole ratio of polyol:polyisocyanate:chain extender is preferably in the range of from about 1:1:0 to about 1:15:14, more preferably from about 1:1:0 to about 1:6:5. Aliphatic polyurethanes useful in the invention can be prepared by first reacting the polyol and diisocyanate to form a prepolymer, then reacting the prepolymer with the chain extender, in a two-step process. The polyurethane may also be prepared by first blending the polyol and chain extender followed by addition of diisocyanate, in a one-pot method. The polyurethane can be a thermoplastic material having a weight-average molecular weight preferably in the range of from about 60,000 to about 200,000 or it can be a thermoset material, i.e., crosslinked.

There are distinct advantages of using the method of seamless microreplication of the present invention to fabricate illumination devices having a plurality of extraction structures. First, by replicating the microstructures directly into the device in a molding step, the microstructures are replicated with a high degree of fidelity. This is important because extraction structures having smoother surfaces and sharper angles give off the highest amount of light in the desired areas with the least amount of losses due to surface imperfections.

According to the prior art, the microstructures were generally either directly machined into the fiber, or a thin strip of material having the microstructures was adhered to the surface of the fiber. With direct machining, only indentions, or grooves, can be made in the fiber. When an extra strip of microstructured material is used an extra interface is added. Such an interface may lead to degraded optical performance such as losses at the extra interface.

Direct machining may take the form of diamond turning where small sections of the fiber are repeatedly removed using a precise diamond-tipped element until the desired groove shape and size are attained. This method, while highly accurate, requires multiple passes for each groove and is thus inefficient. In addition, when softer materials are used for the light guide, it may be difficult to machine precise grooves due to the elastic nature of the fiber material.

Direct machining may also take the form of a stamping process. This process is described in detail in U.S. Pat. No. 5,432,876 to Appeldorn et al. Basically, the stamping process involves providing a stamping tool comprising a die having a series of ridges. The ridges are designed to have the shape and dimensions of the grooves to be imparted in the surface of the fiber. The surface of the fiber is then indented with the stamping tool. This method has the advantage of being more efficient than direct diamond turning because multiple passes are not required. However, because stamping displaces material rather than remove it from the fiber, extra material is displaced, causing surface deformations in the fiber. In addition, this method may only be employed to create surface indentions.

EXAMPLE 1

Mold Preparation

A brass rod 12 mm diameter and 50 cm long, polished to a smooth, optical finish (i.e., features less than 200 nm (8 microinches), RMS roughness) was fixed in the bed of a ProtoTrak two-axis N/C milling machine (Bridgeport Machines Inc., Bridgeport, Conn.). A tungsten carbide cutting tip having an angle profile required for one or more notches to be cut in the brass rod, e.g., 90°, was mounted in the spindle of the milling machine and rotated at approximately 300 rpm, and advanced at a feed rate of approximately 3.7 cm/min. Under computer control, the cutting tip cut notches (microstructures) in the brass rod at precisely indexed intervals, as required for light extraction from the final molded polymeric article, such as described in copending application U.S. Ser. No. 08/789,808, now U.S. Pat. No. 5,845,038 incorporated herein by reference. When all notches were cut, the brass rod, referred hereinafter as the mold master, was removed from the milling machine and cleaned thoroughly to remove traces of metal chips. It is within the scope of the invention that notches of different dimensions and different angles can be cut in the same brass rod by use of more than one cutting tip and multiple passes along the rod.

The mold master was heated at 160° C. for 4 hours then cooled to 23° C. (room temperature). The mold master was then placed vertically on the end cap of a two-piece hollow, round mold, called a "chase," one piece of which is aluminum and the other of which is transparent polycarbonate. The pieces represent halves of the chase splitting the diameter. The chase is 25 cm in diameter and 56 cm long. The end cap is countersunk so as to provide a means to center the rod in the hollow mold. The two halves of the chase were closed and sealed with tape and clamped near the top and bottom, using laboratory hose clamps. A silicone molding material, Sylgard 184 (Dow Corning Corp., Midland, Mich.), was mixed with a curing agent sold by Dow Corning under the trade designation Sylgard in a 10:1 volume ratio under pump vacuum for a time sufficient to remove essentially all of the bubbles. The mixed material was slowly poured into the top of the chase to cover the entire length of the chase master. A countersunk top end cap was placed over the free end of the mold master and fitted into the open top of the chase, thereby centering the mold master in the chase cavity and sealing the chase.

The silicone mold material was allowed to cure overnight at 23° C. (alternatively, the silicon could be cured for 8 hours at 50° C.), after which the chase was removed. The mold master was removed from the mold by first gently separating the silicone from the mold master, then applying air pressure to the inside of the mold and pulling the mold master out of the expanded silicone mold. A hollow, flexible mold, having on its inner surface the requisite microstructured features, was obtained.

EXAMPLE 2

Illumination Device Preparation

A polyurethane-precursor mixture, comprising 39.6 parts by weight bis(4-isocyanatocyclohexyl)methane (for example, that sold under the trade designation Desmodur™ W, from Bayer Corp., Pittsburgh, Pa.), 39.3 parts by weight isocyanurate-containing polyisocyanate (for example, that sold under the trade designation Desmodur™ N-3300, by Bayer Corp.), 80 parts polyester diol (for example, that sold under the trade designation CAPA™ 200, $M_w$ 550, by Solvay Interox, Houston, Tex.), 20 parts by weight polyester triol (for example, that sold under the trade designation CAPA™ 301, $M_w$ 300, by Solvay Interox) was stirred at 23° C. under pump vacuum for 30 minutes, after which vacuum was released and 0.3 parts by weight dibutyltin dimercaptide polymerization catalyst (for example, that sold under the trade designation Foamrez™ UL-1, by Witco Corp., Greenwich, Conn.) was added. Vacuum was reestablished and the mixture was stirred for an additional minute, then allowed to sit for one minute to remove entrained gasses, then vacuum was released.

The chase containing the hollow mold obtained in Example 1 was clamped vertically and the polyurethane-precursor mixture was slowly poured into the silicon mold in a manner so as to avoid generating bubbles in the liquid polyurethane precursor mixture. Curing of the polyurethane illumination device was accomplished at 23° C. for one hour. If necessary, the cured device could be further post-cured by heating at 100° C. for one hour.

The soft, flexible illumination device was removed from the expandable silicone mold by gently flexing the mold to separate it from the device, after which one end of the mold was covered and compressed air was introduced into the other end. The mold was slightly expanded and the illumination device was grasped and pulled from the mold without damage to the mold or loss of precision of the microstructured notches in the illumination device.

To show the illumination characteristics of the molded device, it was dipped three times, with 15 minute drying between dips, in a fluorochemical solution sold under the trade designation Fluorad™ FC-722 by 3M Company, St. Paul, Minn., then dried at 23° C. to provide a low-refractive index coating.

The coated device was then covered with white vinyl tape (in this case, the white vinyl tape sold under Cat. No. 471 by 3M Company, St. Paul, Minn. was used) over approximately 270° of its circumference so that only the molded notches remained exposed. The exposed notches were coated with a thin layer of elemental silver using a kit and method supplied by Lilly Industries, Inc., Woodbridge, Conn. The exposed notches were washed thoroughly with distilled water, then, while still wet, sprayed with a dilute aqueous solution of stannous fluoride. Excess tin solution was washed off with distilled water, then sprayed with an aqueous ammoniacal solution comprising silver nitrate, after which the illumination device was further rinsed with distilled water, then dried and heated at about 70° C. for two minutes. The protective tape was removed to obtain the desired illumination device having silvered notches.

Illumination characteristics of the resulting device, having silvered notches, were measured in comparison to SAE Standard J1957 JUN93 for Center High Mounted Stop Lamp (CHMSL) devices. The illumination device of the invention was lit from one end with 95 lumens from a light source (Type 20500, Fostec Inc., Auburn, N.Y.), employing a 150 W halogen bulb (Ushio KK, Tokyo, Japan). The data set resulting from single-ended illumination was added to a mirror image of itself to indicate the performance of a CHMSL illuminated from both ends. The results of this measurement and calculation are shown in Table 1.

In Table 1, light intensity measurements (candelas) are shown for the specified photometric test area, which is a solid cone angle from 10 degrees left (10L) to 10 degrees right (10R) and from 10 degrees up (10U) to 5 degrees down (5D) of the center of the CHMSL. Values marked as "S" in Table 1 represent the minimum standard intensity acceptable under the SAE Standard. Within the measurement area, the intensity may not exceed 130 candela over an area larger than that generated by a 0.25 degree radius.

TABLE 1

CHMSL Illumination

| VERTICAL | HORIZONTAL | | | | |
|---|---|---|---|---|---|
| | 10L | 5L | 0 | 5R | 10R |
| 10U | 46 | 55.9 | 63.6 | 69.2 | 66 |
| 10U-S | 8 | * | 16 | * | 8 |
| 5U | 65 | 78.3 | 83.3 | 87.5 | 85 |
| 5U-S | 16 | 25 | 25 | 25 | 16 |
| 0 | 75.9 | 87.4 | 92.1 | 92.5 | 82.4 |
| 0-S | 16 | 25 | 25 | 25 | 16 |
| 5D | 75.3 | 75.3 | 91.2 | 86.7 | 79.9 |
| 5D-S | 16 | 25 | 25 | 25 | 16 |

*No standard specified

The data of Table 1 show that the molded and demolded illumination device of the invention provided light at SAE Standard test points for a CHMSL greater than the minimum and less than the maximum candelas for each test point. The mold design was, therefore, validated, and the method of making a CHMSL was shown to be satisfactory.

EXAMPLE 3
Illumination Device Preparation

A hard-formula polyurethane precursor formulation was prepared as described in Example 2, comprising 39 parts by weight Desmodur W, 38.7 parts by weight Desmodur N-3300, 80 parts by weight polyester diol (for example, that sold under the trade designation Tone 0201, $M_w$ 530, by Union Carbide Corp., Danbury, Conn.), 20 parts by weight polyester triol (for example, that sold under the trade designation Tone 0301, $M_w$ 300, by Union Carbide Corp.), and 1.7 parts by weight dibutyltin dimercaptide catalyst (for example, that sold under the trade designation Foamrez™ UL-1, by Witco Corp.). On curing and demolding, as described in Example 2, an optically clear, flexible polyurethane illumination device was obtained.

What is claimed is:

1. A method microreplication using a one-piece mold comprising the steps of:
   providing an expandable, hollow, one-piece mold having an interior with an interior surface including a plurality of microstructured features thereon, the interior being accessible through an opening in the mold;
   filling the interior of the mold with a curable material;
   curing the curable material inside the mold to thereby form a molded article, wherein the step of curing the curable material to form a molded article substantially replicates the plurality of microstructured features of the interior surface of the mold onto the molded article; and
   elastically expanding the mold to thereby separate the molded article from the mold,
   wherein the molded article comprises a substantially optically transparent light guide, and wherein the replicated microstructured features imparted on the light guide comprise a plurality of light extraction structures.

2. The method of claim 1, wherein at least a portion of the light extraction structures are front extracting.

3. The method of claim 1, wherein at least a portion of the light extraction structures are back extracting.

4. A method of molding a seamless illumination device comprising the steps of:
   providing an expandable, hollow, one-piece mold having an interior with an interior surface including a plurality of microstructured features thereon, the interior being accessible through an opening in the mold;
   providing a curable material that, when cured, forms a substantially optically transparent material;
   filling the interior of the mold with the curable material;
   curing the curable material inside the mold to thereby form an illumination device, the illumination device being substantially optically transparent, wherein the step of curing the curable material imparts a replica of the plurality of microstructured features of the interior surface of the mold to the illumination device, the replica of the plurality of microstructured features thereby forming a plurality of light extraction structures on the illumination device; and
   elastically expanding the mold to thereby separate the illumination device from the mold.

5. The method of claim 4, wherein at least a portion of the light extraction structures are front extracting.

6. The method of claim 4, wherein at least a portion of the light extraction structures are back extracting.

7. The method of claim 4 wherein the elastomer material is a silicone material.

* * * * *